United States Patent
Jang

(10) Patent No.: US 11,916,223 B2
(45) Date of Patent: Feb. 27, 2024

(54) ALKALI METAL-SULFUR SECONDARY BATTERY CONTAINING CONDUCTING POLYMER NETWORK-PROTECTED CATHODE MATERIAL PARTICULATES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 170 days.

(21) Appl. No.: 16/407,731

(22) Filed: May 9, 2019

(65) Prior Publication Data

US 2020/0358084 A1 Nov. 12, 2020

(51) Int. Cl.
*H01M 4/136* (2010.01)
*H01M 4/133* (2010.01)
(Continued)

(52) U.S. Cl.
CPC ......... *H01M 4/136* (2013.01); *H01M 4/0416* (2013.01); *H01M 4/133* (2013.01);
(Continued)

(58) Field of Classification Search
CPC ...... H01M 4/136; H01M 4/133; H01M 4/602; H01M 4/134; H01M 10/052;
(Continued)

(56) References Cited

U.S. PATENT DOCUMENTS 2,798,878 A 7/1957 Hummers
10,122,044 B2 11/2018 Tan et al.
(Continued)

FOREIGN PATENT DOCUMENTS

CN 108232138 A 6/2018
EP 3086388 B1 6/2018

OTHER PUBLICATIONS

U.S. Appl. No. 16/380,341 Nonfinal Office Action dated Apr. 2, 2021, 10 pages.
(Continued)

*Primary Examiner* — Kiran Quraishi Akhtar

(57) ABSTRACT

Provided is a rechargeable alkali metal-sulfur cell comprising an anode active material layer, an electrolyte, and a cathode active material layer comprising multiple particulates, wherein at least one of the particulates comprises one or a plurality of sulfur-containing material particles being partially or fully embraced or encapsulated by a thin shell layer of a conducting polymer network, having a lithium ion conductivity no less than $10^{-8}$ S/cm, an electron conductivity from $10^{-8}$ to $10^3$ S/cm at room temperature (typically up to $5 \times 10^{-2}$ S/cm), and a shell layer thickness from 0.5 nm to 10 μm. This battery exhibits an excellent combination of high sulfur content, high sulfur utilization efficiency, high energy density, and long cycle life. Also provided are a powder mass containing such multiple particulates, a cathode layer comprising such multiple particulates, and a method of producing the cathode layer and the battery cell.

20 Claims, 8 Drawing Sheets

(51) Int. Cl.
*H01M 4/60* (2006.01)
*H01M 4/134* (2010.01)
*H01M 10/052* (2010.01)
*H01M 4/36* (2006.01)
*H01M 10/0569* (2010.01)
*H01M 4/04* (2006.01)
*H01M 4/58* (2010.01)

(52) U.S. Cl.
CPC ........... *H01M 4/134* (2013.01); *H01M 4/364* (2013.01); *H01M 4/5815* (2013.01); *H01M 4/602* (2013.01); *H01M 10/052* (2013.01); *H01M 10/0569* (2013.01)

(58) Field of Classification Search
CPC .. H01M 10/0569; H01M 10/39; H01M 10/24; H01M 10/3909; H01M 4/364; H01M 4/0416; H01M 4/5815; H01M 4/622; H01M 4/625; H01M 4/381; Y02E 60/10
See application file for complete search history.

(56) References Cited

U.S. PATENT DOCUMENTS

| | | | |
|---|---|---|---|
| 2004/0018430 A1 | 1/2004 | Holman et al. | |
| 2005/0136330 A1 | 6/2005 | Mao et al. | |
| 2008/0050658 A1 | 2/2008 | Abe et al. | |
| 2011/0165466 A1* | 7/2011 | Zhamu | H01M 10/0525 429/231.8 |
| 2012/0064409 A1 | 3/2012 | Zhamu et al. | |
| 2013/0040197 A1* | 2/2013 | Liu | H01B 1/12 429/213 |
| 2013/0059174 A1 | 3/2013 | Zhamu | |
| 2013/0171338 A1 | 7/2013 | Pan et al. | |
| 2013/0224632 A1 | 8/2013 | Roumi | |
| 2014/0045065 A1 | 2/2014 | Bao et al. | |
| 2014/0154572 A1 | 6/2014 | Singh et al. | |
| 2014/0242458 A1 | 8/2014 | Abe et al. | |
| 2014/0255794 A1* | 9/2014 | Zhang | H01M 4/136 429/337 |
| 2015/0221935 A1* | 8/2015 | Zhou | H01M 4/76 429/213 |
| 2015/0311497 A1 | 10/2015 | Nettesheim et al. | |
| 2016/0177109 A1 | 6/2016 | Hendricks et al. | |
| 2016/0294000 A1* | 10/2016 | He | H01M 10/054 |
| 2016/0351909 A1* | 12/2016 | Bittner | H01M 4/366 |
| 2017/0179468 A1* | 6/2017 | Fanous | H01M 4/362 |
| 2017/0194648 A1* | 7/2017 | Bucur | H01M 4/136 |
| 2017/0288211 A1 | 10/2017 | Zhamu et al. | |
| 2017/0338471 A1 | 11/2017 | Zheng et al. | |
| 2017/0338472 A1 | 11/2017 | Zhamu et al. | |
| 2017/0365877 A1 | 12/2017 | Kang et al. | |
| 2018/0051137 A1 | 2/2018 | Kim et al. | |
| 2018/0166759 A1 | 6/2018 | Zhamu et al. | |
| 2018/0183098 A1 | 6/2018 | Yamamoto et al. | |
| 2018/0301707 A1 | 10/2018 | Pan et al. | |
| 2018/0351201 A1 | 12/2018 | Zhamu et al. | |
| 2019/0334166 A1 | 10/2019 | Ishii | |
| 2020/0006767 A1 | 1/2020 | Du et al. | |
| 2020/0358081 A1 | 11/2020 | Lin et al. | |
| 2022/0102758 A1 | 3/2022 | Locke et al. | |

OTHER PUBLICATIONS

U.S. Appl. No. 16/404,109 Nonfinal Office Action dated Feb. 18, 2021, 7 pages.

U.S. Appl. No. 16/404,111 Nonfinal Office Action dated Dec. 9, 2020, 6 pages.

Gurunathan et al., "Synthesis of Hierarchically Porous SnO2 Microspheres and Performance Evaluation as Li-Ion Battery Anode by Using Different Binders" ACS Appl. Mater. Inter. (2014) vol. 6, No. 19, pp. 16556-16564.

Ge, M, et al.; Review of porous silicon preparation and its application for lithium-ion battery anodes, Nanotechnology 24 (2013) 422001.

U.S. Appl. No. 16/380,336; Non-Final Office Action dated Feb. 23, 2022; 13 pages.

U.S. Appl. No. 16/411,645; Non-Final Office Action dated Jan. 3, 2022; 85 pages.

U.S. Appl. No. 16/380,336; Non-Final Office Action dated Oct. 17, 2022; 47 pages.

U.S. Appl. No. 16/390,592; Non-Final Office Action dated Oct. 6, 2022; 39 pages.

U.S. Appl. No. 16/404,111; Final Office Action dated Aug. 26, 2022; 28 pages.

U.S. Appl. No. 16/411,645; Final Office Action dated Jan. 19, 2022; 149 pages.

U.S. Appl. No. 16/411,645; Non-Final Office Action dated Jul. 11, 2023; 100 pages.

U.S. Appl. No. 16/411,645; Non-Final Office Action dated Sep. 16, 2022; 36 pages.

* cited by examiner

ALKALI METAL-SULFUR SECONDARY BATTERY CONTAINING CONDUCTING POLYMER NETWORK-PROTECTED CATHODE MATERIAL PARTICULATES

FIELD

The present disclosure provides a unique cathode composition and structure in a secondary or rechargeable alkali metal-sulfur battery, including the lithium-sulfur battery, sodium-sulfur battery, and potassium-sulfur battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li°$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities of optimally designed Li—S cell configurations can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electro-active cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present disclosure is to provide a rechargeable alkali metal battery (e.g., Li—S, Na—S, and K—S battery) that exhibits an exceptionally high specific energy or high energy density. One particular technical goal of the present disclosure is to provide an alkali metal-sulfur or alkali ion-sulfur cell with a cell specific energy greater than 400 Wh/kg, preferably greater than 500 Wh/kg, and more preferably greater than 600 Wh/kg (all based on the total cell weight).

Another object of the present disclosure is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present disclosure is to provide a rechargeable alkali metal-sulfur cell based on rational materials and battery designs that overcome or significantly reduce the following issues commonly associated with conventional Li—S and Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) poor sulfur utilization efficiency; (d) dissolution of S and alkali metal polysulfide in electrolyte; (e) migration of alkali metal polysulfides from the cathode to the anode (which irreversibly react with Li, Na, or K at the anode), resulting in active material loss and capacity decay (the shuttle effect); and (f) short cycle life.

SUMMARY

The present disclosure provides an alkali metal-sulfur cell (e.g. lithium-sulfur cell, sodium-sulfur cell, and potassium-sulfur cell). The lithium-sulfur battery can include the lithium metal-sulfur battery (having lithium metal as the anode active material and sulfur as the cathode active material) and the lithium ion-sulfur battery (e.g. pre-lithiated Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

In some embodiments, the alkali metal-sulfur cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer.

In this cell, the cathode active material layer contains a plurality of particulates (also referred to as multi-functional particulates) of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of the particulates comprises one or a plurality of primary particles of the sulfur-containing material that are encapsulated by, embedded in, dispersed in, or bonded by an electrically and ionically conducting network of cross-linked conjugated polymer chains having a lithium ion conductivity from $10^{-8}$ S/cm to $5\times10^{-2}$ S/cm and an electron conductivity from $10^{-8}$ to $10^3$ S/cm, wherein the primary particles have a diameter or thickness from 0.5 nm to 20 µm. The multi-functional particulate may have a diameter (or shortest dimension) preferably and typically from 500 nm to 30 µm, and more preferably and typically from 1 µm to 20 µm.

Preferably, the conducting network of cross-linked polymer chains contains a conjugated polymer selected from polyacetylene, polythiophene, poly(3-alkylthiophenes), polypyrrole, polyaniline, poly(isothianaphthene), poly(3,4-ethylenedioxythiophene) (PEDOT), alkoxy-substituted poly (p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1, 2-diphenylvinylene)], poly(3',7'-dimethyloctyloxy phenylene vinylene), polyparaphenylene, polyparaphenylene, polyparaphenylene sulphide, polyheptadiyne, poly (3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof. In some preferred embodiments, the conducting polymer network comprises chains of a conjugated polymer selected from polyaniline, polypyrrole, or polythiophene.

The present disclosure also provides a method of producing a rechargeable alkali metal-sulfur cell having a long cycle-life; the method comprising: (a) providing an anode active material layer; (b) providing particulates comprising primary particles of a sulfur-containing material encapsulated or embraced by a thin layer of an electrically and ionically conducting network of cross-linked conjugated polymer chains having a lithium ion conductivity from $10^{-8}$ S/cm to $5\times10^{-2}$ S/cm and an electron conductivity from $10^{-8}$ to $10^3$ S/cm when measured at room temperature; (c) forming the particulates, a resin binder, and an optional conductive additive into a cathode active material layer; and (d) combining the anode active material layer, an optional anode current collector, the cathode active material layer, an optional cathode current collector, an optional porous separator between the anode active material layer and the cathode active material layer, and an electrolyte to form the alkali metal-sulfur cell.

In some embodiments, the sulfur-containing material is selected from a sulfur-carbon hybrid, sulfur-graphite hybrid, sulfur-graphene hybrid, conducting polymer-sulfur hybrid, metal sulfide, sulfur compound, or a combination thereof. The resulting alkali metal-sulfur cell typically has a cycle-life longer than 1,000 cycles, which is unusual for a Li—S cell, room temperature Na—S cell, or K—S cell.

In some embodiments, the conducting network of cross-linked polymer chains further comprises from 0.01% to 50% by weight of a conductive reinforcement material dispersed in said conducting network, wherein said conductive reinforcement material is selected from graphene sheets, carbon nanotubes, carbon nanofibers, metal nanowires, conductive polymer fibers, or a combination thereof.

The conducting reinforcement material is preferably in a filamentary or sheet-like form, such as a nanotube, nanofiber, nano-wire, nano-platelet, or nano-disc. In some embodiments, the conductive reinforcement material is selected from graphene sheets, carbon nanotubes, carbon nanofibers, metal nanowires, conductive polymer fibers, or a combination thereof. These are electron-conducting materials and the conducting polymer network is a lithium ion- and sodium ion-conducting material. By combining such a conducting polymer network and a conducting reinforcement, one obtains a composite that is both electron conducting and ion-conducting and capable of allowing electrons and lithium ions to migrate in and out of the particulate without much resistance.

The graphene sheets to be dispersed in a conducting polymer network are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nano-fibers or electro-spinning based carbon nano-fibers (e.g. electro-spun polymer nano-fibers that are subsequently carbonized).

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from meso-phase pitch, meso-phase carbon, meso-carbon micro-bead (MCMB), coke particle, expanded graphite flake, artificial graphite particle, natural graphite particle, highly oriented pyrolytic graphite, soft carbon particle, hard carbon particle, carbon nanotube, carbon nano-fiber, carbon fiber, graphite nano-fiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

In certain embodiments, the conducting polymer network further contains from 0.1% to 50% by weight of a lithium ion-conducting or sodium ion-conducting additive dispersed therein. In certain embodiments, the lithium ion-conducting may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$. In certain embodiments, the lithium ion-conducting additive or sodium ion-conducting additive is selected from the following lithium salts or their sodium salt counterparts: lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the conducting polymer network forms a mixture or blend with a lithium ion-conducting polymer selected from a lower molecular weight (<500,000 g/mole) version of poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, polydimethylsiloxane, poly(vinylidene fluoride)-hexafluoropropylene (PVDF-HFP), a sulfonated derivative thereof, or a combination thereof.

The present disclosure enables the rechargeable alkali metal-sulfur cell to deliver a sulfur utilization efficiency from 80% to 99%, more typically from 85% to 97%.

In the rechargeable alkali metal-sulfur cell, the electrolyte is selected from polymer electrolyte, polymer gel electrolyte, composite electrolyte, ionic liquid electrolyte, aqueous electrolyte, organic liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The electrolyte may contain a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer of the invented cell contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-sulfur cell may be a lithium ion-sulfur cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

The rechargeable alkali metal-sulfur cell may be a sodium ion-sulfur cell or potassium ion-sulfur cell and, in this case, the anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof; and combinations thereof.

Preferably, in the rechargeable alkali metal-sulfur cell, the particulates contain from 80% to 99% by weight of sulfur, metal sulfide, or metal compound based on the total weight of the high-capacity polymer and the sulfur, metal sulfide, or metal compound combined.

The present disclosure also provides a cathode active material layer for a rechargeable alkali metal-sulfur cell. This cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of the particulates comprises one or a plurality of sulfur-containing material particles being embraced or encapsulated by a thin layer of a conducting polymer network, having a lithium ion conductivity no less than $10^{-8}$ S/cm at room temperature (typically up to $5\times10^{-2}$ S/cm), and a thickness from 0.5 nm to 10 μm (preferably and typically from 1 nm to 1 μm, more preferably <100 nm).

In this product (a cathode layer), the sulfur-carbon hybrid, sulfur-graphite hybrid, sulfur-graphene hybrid, or conducting polymer-sulfur hybrid (primary particles) is a mixture, blend, composite, chemically or physically bonded entity of sulfur or sulfide with a carbon, graphite, graphene, or conducting polymer material. These primary particles are then made into secondary particles (particulates) having a thin layer of conducting polymer network composite embracing the primary particles.

In the cathode active material layer, the metal sulfide may contain $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The carbon or graphite material in the cathode active material layer may be selected from meso-phase pitch, meso-phase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nano-fiber, carbon fiber, graphite nano-fiber, graphite fiber, carbonized polymer fiber, activated carbon, carbon black, or a combination thereof.

In certain embodiments, the cathode active material layer further comprises a binder resin that bonds the multiple particulates (of encapsulated sulfur-containing particles) together to form the cathode active material layer, wherein the binder resin is not part of the multiple particulates (i.e. not included inside the core portion of a particulate) and is external to the multiple particulates. In other words, the conducting polymer network composite matrix does not embrace the binder resin therein and the binder resin does not embrace the particulates either.

The present disclosure also provides a powder mass product for use in a lithium-sulfur battery cathode. The powder mass comprises multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates comprises one or a plurality of sulfur-containing material particles being partially or totally embraced or encapsulated by a thin layer of a conducting polymer network composite (described above) having a lithium ion conductivity from $10^{-8}$ S/cm to $5\times10^{-2}$ S/cm at room temperature, and a thickness from 0.5 nm to 10 μm (preferably less than 1 μm and more preferably <100 nm).

In the powder mass, the sulfur-carbon hybrid, sulfur-graphite hybrid, sulfur-graphene hybrid, or conducting polymer-sulfur hybrid (primary particles) contains a mixture, blend, composite, chemically or physically bonded entity of sulfur or sulfide with a carbon, graphite, graphene, or conducting polymer material. These primary particles are combined with a conducting polymer network composite to form secondary particles (particulates), wherein the particulate comprises a thin layer of conducting polymer network composite encapsulating or embracing a core of a primary particle or multiple primary particles.

In the powder mass, the metal sulfide preferably contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The present disclosure also provides a method of manufacturing a rechargeable alkali metal-sulfur cell. The method comprises: (a) Providing a cathode and an optional cathode current collector to support the cathode; (b) Providing an alkali metal anode, selected from Li, Na, K, or a combination thereof and an optional anode current collector to support the anode; (c) Providing an electrolyte in contact with the anode and the cathode and an optional separator electrically separating the anode and the cathode; wherein the cathode contains multiple particulates of a sulfur-containing material wherein at least one of the particulates comprises one or a plurality of sulfur-containing material particles which are encapsulated by, embedded in, dispersed in, or bonded by an electrically and ionically conducting network of cross-linked conjugated polymer chains having a lithium ion conductivity from $10^{-8}$ S/cm to $5 \times 10^{-2}$ S/cm and an electron conductivity from $10^{-8}$ to $10^3$ S/cm, wherein the primary particles have a diameter or thickness from 0.5 nm to 20 μm (preferably from 1 nm to 1 μm, more preferably from 1 nm to 100 nm, and most preferably, from 1 nm to 10 nm).

In the above manufacturing method, the sulfur-containing material preferably is selected from a sulfur-carbon hybrid, sulfur-graphite hybrid, sulfur-graphene hybrid, conducting polymer-sulfur hybrid, metal sulfide, sulfur compound, or a combination thereof. The sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material In the manufacturing method, the operation of providing multiple particulates may include encapsulating or embracing the one or a plurality of sulfur-containing material particles with a thin layer of conducting polymer network composite using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In some embodiments, the operation of providing multiple particulates includes partially or fully encapsulating or embracing one or a plurality of sulfur-containing material particles with a mixture of a conducting polymer network composite with an electronically conductive polymer (non-crosslinked), a lithium-ion conducting material, a reinforcement material, or a combination thereof. Preferably, the lithium ion-conducting material is dispersed in said conducting polymer network composite and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x \leq 1$, $1 \leq y \leq 4$.

In certain embodiments, the lithium ion-conducting material is dispersed in the conducting polymer network and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In the instant Li—S cell, the reversible specific capacity of the sulfur cathode is typically and preferably no less than 1,000 mAh per gram and often exceeds 1,200 or even 1,500 mAh per gram of entire cathode layer. The high specific capacity of the presently invented cathode, when combined with a lithium anode, typically leads to a cell specific energy significantly greater than 400 Wh/Kg, based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 500 Wh/kg and, in some examples, exceeds 600 Wh/kg.

The disclosure also provides another method of manufacturing a rechargeable alkali metal-sulfur cell selected from lithium-sulfur cell, sodium-sulfur cell, or potassium-sulfur cell. The method comprises: (a) providing an anode containing an anode active material layer and an optional anode current collector supporting the anode active material layer; (b) providing a cathode containing primary particles of a sulfur-based cathode active material being encapsulated by a thin layer of a conducting polymer network; (c) providing an electrolyte with an optional porous separator layer in ionic contact with the anode active material layer and the cathode active material layer; and (d) combining the anode, the cathode, and the electrolyte to form a battery unit and encasing the battery unit in a protective housing to form the rechargeable alkali metal-sulfur cell. This conducting polymer network has been defined in earlier portion of this section.

Also provided in this disclosure is a method of producing the invented multiple particulates; the method comprising (A) dispersing a plurality of primary particles of a sulfur-containing cathode active material, having a diameter or thickness from 0.5 nm to 20 μm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in said micro-droplets to form the multi-functional particulates. The reactive slurry may further comprise a dopant, a reinforcement material, a lithium ion-conducting additive, an electron-conducting additive, or a combination thereof.

In certain embodiments, step (B) of forming micro-droplets comprises a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

In some embodiments, the micro-droplets contain water or a liquid solvent and the method further comprises a step of removing said water or solvent.

In some embodiments, the reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nanowires, or a combination thereof.

These and other advantages and features of the present disclosure will become more transparent with the description of the following best mode practice and illustrative examples.

DETAILED DESCRIPTION OF PREFERRED EMBODIMENTS

For convenience, the following discussion of preferred embodiments is primarily based on Li—S cells, but the same or similar composition, structure, and methods are applicable to Na—S and K—S cells. Examples are presented for Li—S cells, room-temperature Na—S cells, and K—S cells.

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present disclosure provides such a cathode active layer, its constituent powder mass product, the resulting Li—S cell, and a method of producing such a cathode active layer and battery.

Figure 9:
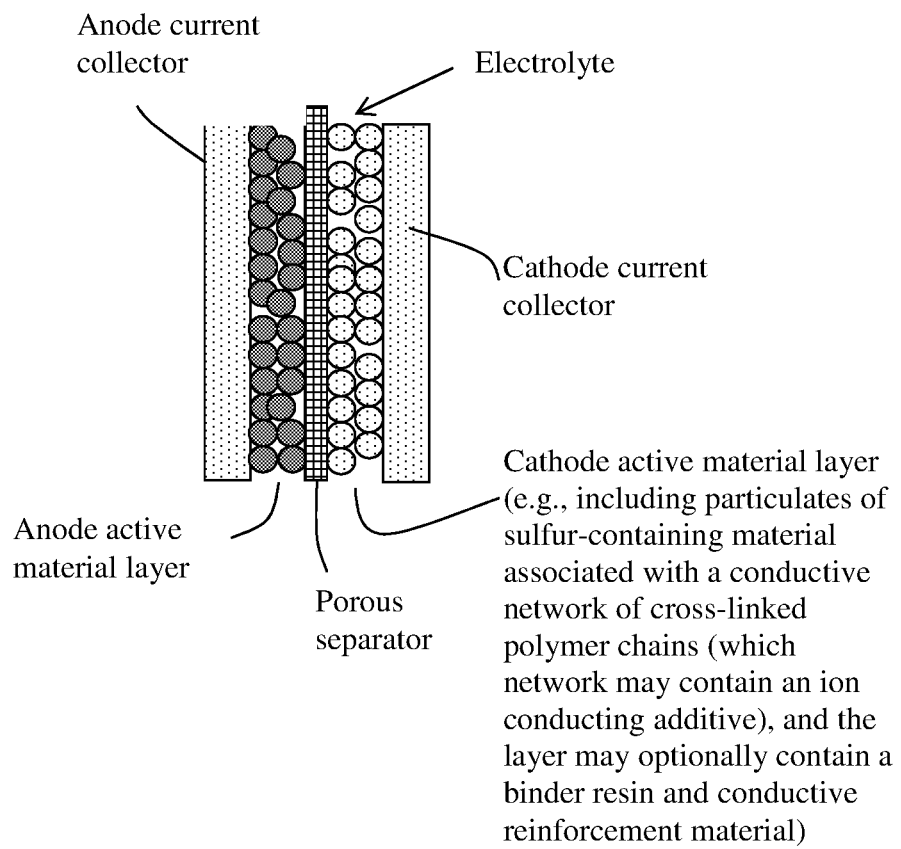
FIG. 9 A method of producing the multiple particulates of cathode active material in the rechargeable alkali metal-sulfur cell of FIG. 8.

In some embodiments, and as shown in FIG. 9, the alkali metal-sulfur cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer (separator is not required where a solid state electrolyte is used, for instance); wherein the cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of the particulates comprises one or a plurality of the sulfur-containing material particles that are encapsulated by, embedded in, dispersed in, or bonded by an electrically and ionically conducting network of cross-linked conjugated polymer chains having a lithium ion conductivity from $10^{-8}$ S/cm to $5 \times 10^{-2}$ S/cm and an electron conductivity from $10^{-8}$ to $10^3$ S/cm, wherein the primary particles have a diameter or thickness from 0.5 nm to 20 μm (typically from 1 nm to 1 μm, but preferably <100 nm and more preferably <10 nm).

Figure 8:
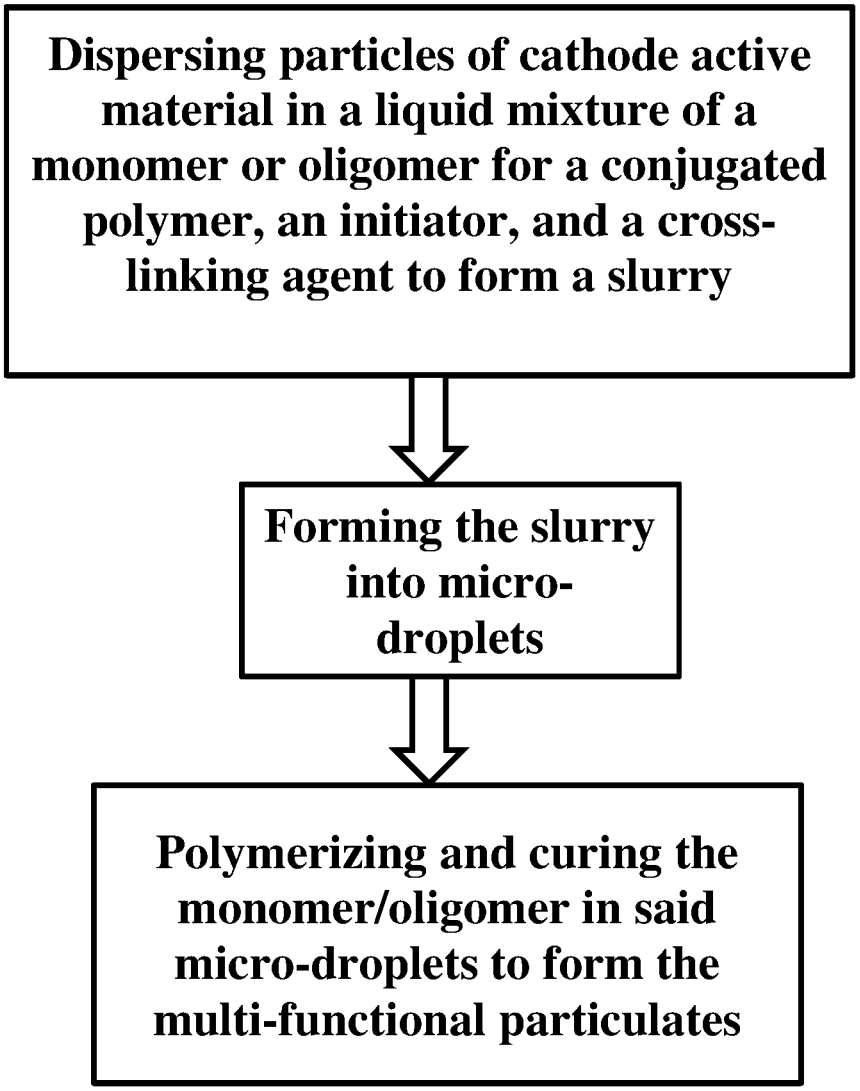
FIG. 8 The rechargeable alkali metal-sulfur cell disclosed herein.

A method of producing the multiple particulates described above, as shown in FIG. 8, may include (A) dispersing a plurality of primary particles of a sulfur-containing cathode active material, having a diameter or thickness from 0.5 nm to 20 μm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in said micro-droplets to form the multi-functional particulates.

The conducting polymer network may comprise from 0.01% to 50% by weight of a conductive reinforcement material dispersed in a conducting polymer network based on the total weight of the conducting polymer network composite, wherein the conductive reinforcement material may be selected from graphene sheets, carbon nanotubes, carbon nanofibers, metal nanowires, conducting polymer fibers, or a combination thereof.

The conducting reinforcement material is preferably in a filamentary or sheet-like form, such as a nanotube, nanofiber, nano-wire, nano-platelet, or nano-disc. In some embodiments, the conductive reinforcement material is selected from graphene sheets, carbon nanotubes, carbon nanofibers, metal nanowires, conductive polymer fibers, or a combination thereof. These are electron-conducting materials and the conducting polymer network is a lithium ion- and sodium ion-conducting material. By combining such a conducting polymer network and a conducting reinforcement (0-50% by weight, preferably 0.1%-30%, and more preferably 0.1-15%), one obtains a composite that is both electron conducting and ion-conducting and capable of allowing electrons and lithium ions to migrate in and out of the particulate without much resistance.

The graphene sheets to be dispersed in a conducting polymer network are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nano-fibers or electro-spinning based carbon nano-fibers (e.g. electro-spun polymer nano-fibers that are subsequently carbonized).

Preferably, the conducting network of cross-linked polymer chains contains a conjugated polymer selected from polyacetylene, polythiophene, poly(3-alkylthiophenes), polypyrrole, polyaniline, poly(isothianaphthene), poly(3,4-ethylenedioxythiophene) (PEDOT), alkoxy-substituted poly (p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1, 2-diphenylvinylene)], poly(3',7'-dimethyloctyloxy phenylene vinylene), polyparaphenylene, polyparaphenylene, polyparaphenylene sulphide, polyheptadiyne, poly (3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof. In some preferred embodiments, the conducting polymer network comprises chains of a conjugated polymer selected from polyaniline, polypyrrole, or polythiophene.

The sulfur-carbon hybrid, sulfur-graphite hybrid, sulfur-graphene hybrid, or conducting polymer-sulfur hybrid may be a mixture, blend, composite, or chemically or physically bonded entity of sulfur or sulfide with a carbon, graphite, graphene, or conducting polymer material. For instance, a sulfur-graphene hybrid can be a simple mixture (in a particle form) of sulfur and graphene prepared by ball-milling. Such a hybrid can contain sulfur bonded on surfaces of a graphene oxide sheet, etc. As another example, the sulfur-carbon hybrid can be a simple mixture (in a particle form) of sulfur and carbon nanotubes, or can contain sulfur residing in pores of activated carbon particles. In the instant cathode layer, these particles of sulfur hybrid are embraced by a conducting polymer network composite.

In the rechargeable alkali metal-sulfur cell, the metal sulfide may contain a material denoted by $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal sulfide in the cathode layer contains $Li_2S_1$, $Li_2S_2$, $Li_2S_3$, $Li_2S_4$, $Li_2S_5$, $Li_2S_6$, $Li_2S_7$, $Li_2S_8$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S_5$, $K_2S_6$, $K_2S_7$, $K_2S_8$, $K_2S_9$, or $K_2S_{10}$.

In the rechargeable alkali metal-sulfur cell, the carbon or graphite material in the cathode active material layer may be selected from meso-phase pitch, meso-phase carbon, meso-carbon micro-bead (MCMB), coke particle, expanded graphite flake, artificial graphite particle, natural graphite particle, highly oriented pyrolytic graphite, soft carbon particle, hard carbon particle, carbon nanotube, carbon nano-fiber, carbon fiber, graphite nano-fiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-sulfur hybrid may preferably contain an intrinsically conductive conjugated polymer selected from polyaniline, polypyrrole, polythiophene, polyfuran, a bi-cyclic polymer, a sulfonated derivative thereof, or a combination thereof. This can be a simple mixture of sulfur or metal sulfide with a conducting polymer.

In certain embodiments, the conducting polymer network contains from 0.1% to 50% by weight of a lithium ion-, sodium ion-, or potassium ion-conducting additive dispersed therein. The lithium ion-conducting additive, along with the conductive reinforcement material, is dispersed in the conducting polymer network and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$. The lithium ion-conducting additive may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof. The sodium ion- or potassium ion-conducting additive, dispersed in the conducting polymer network, may be selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

Figure 4:
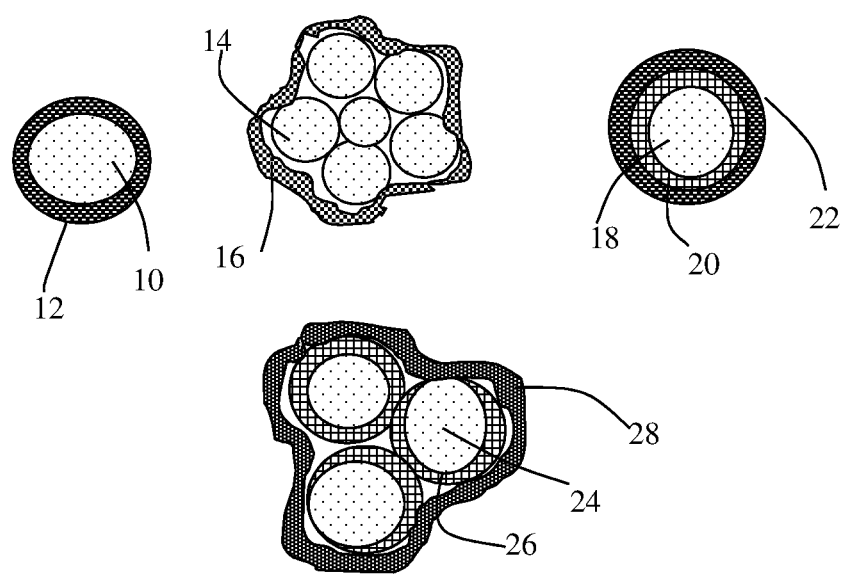
FIG. 4 Schematic of four types of conducting polymer network-embraced S-containing cathode active material particles.

As illustrated in FIG. 4, the present disclosure provides four major types of particulates of conducting polymer network-encapsulated cathode active material particles. The first one is a single-particle particulate containing a cathode active material core 10 (e.g. particle of a sulfur-CNT mixture) encapsulated by a conducting polymer network shell 12. The second is a multiple-particle particulate containing multiple cathode active material particles 14 (e.g. particles of sulfur-graphene mixture, sulfur-carbon black mixture, activated carbon particles having pores impregnated with S, lithium polysulfide particles, etc.), optionally along with other non-active materials (e.g. particles of graphite or hard carbon, not shown) or conductive additive, which are encapsulated by a conducting polymer network 16. The third is a single-particle particulate containing a cathode active material core 18 coated by a carbon or graphene layer 20 (or other conductive material) and further encapsulated by a conducting polymer network 22. The fourth is a multiple-particle particulate containing multiple cathode active material particles 24 coated with a conductive protection layer 26 (carbon, graphene, etc.), optionally along with other non-active materials (e.g. particles of graphite or hard carbon, not shown) or conductive additive, which are encapsulated by a conducting polymer network shell 28. These cathode active material particles can be based on sulfur compound, metal polysulfide, etc., instead of neat sulfur.

Figure 3:
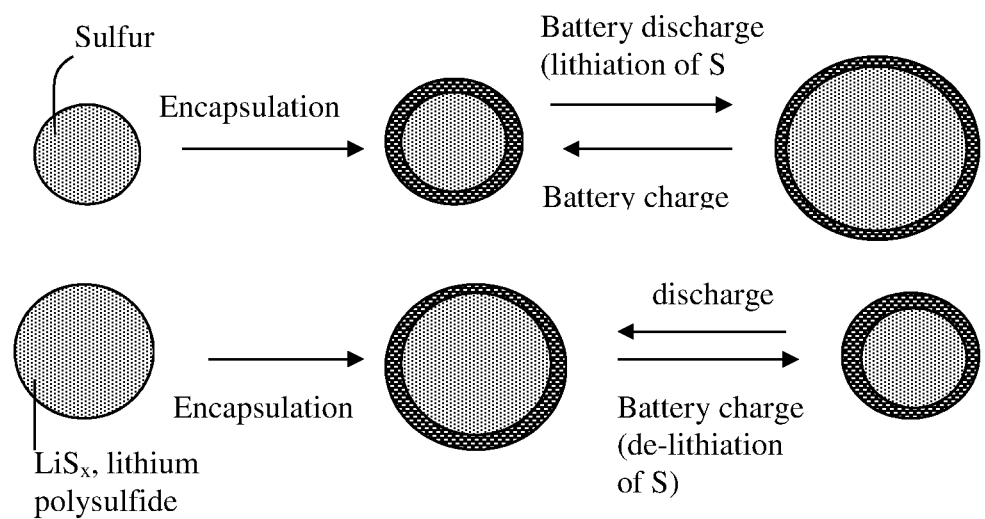
FIG. 3 Schematic of the presently invented conducting polymer network-encapsulated particles of a sulfur cathode active material. The surprisingly high elastic deformation capability of the conducting polymer network shell enables the shell to expand and contract congruently and conformingly with the core particle.

As schematically illustrated in the upper portion of FIG. 3, a sulfur-based particle can be encapsulated by a conducting polymer network shell to form a core-shell structure (sulfur core and conducting polymer network-based shell in this example). As the lithium-sulfur battery is discharged, the cathode active material (e.g. sulfur in the conducting polymer network-encapsulated S/CNT particle) reacts with lithium ions to form lithium polysulfide which expands in volume. Due to the high elasticity of the encapsulating shell (the conducting polymer network), the shell will not be broken into segments (in contrast to the broken carbon shell). That the conducting polymer network shell remains intact, preventing the exposure of the underlying lithium sulfide to electrolyte and, thus, preventing the lithium sulfide from dissolving in the electrolyte during repeated charges/discharges of the battery. This strategy prevents continuing migration of lithium polysulfide to the anode side where it would otherwise react with lithium and be unable to return to the cathode (the shuttle effect). This shuttle effect is mainly responsible for continued capacity decay in a conventional Li—S, room-temperature Na—S, or K—S cell.

Alternatively, referring to the lower portion of FIG. 3, lithium sulfide is used as the cathode active material. A layer of conducting polymer network may encapsulate around the lithium polysulfide particle to form a core-shell structure. When the Li—S battery is charged and lithium ions are released from the cathode, the cathode active material particle contracts. However, the conducting polymer network is capable of elastically shrinking in a conformal manner; hence, leaving behind no gap between the protective shell and the sulfur. Such a configuration is amenable to subsequent lithium reaction with sulfur. The conducting polymer network shell expands and shrinks congruently with the expansion and shrinkage of the encapsulated core cathode active material particle, enabling long-term cycling stability of a Li—S or Na—S battery.

B. Conducting Polymer Network (Including Composites)

Preferably and typically, the conducting polymer network composite has a lithium ion conductivity no less than $10^{-6}$ S/cm, more preferably no less than $10^{-4}$ S/cm, further preferably no less than $10^{-3}$ S/cm, and most preferably no less than $10^{-2}$ S/cm. In some embodiments, the conducting polymer network contains no other additive or filler dispersed therein. In others, the conducting polymer network is a composite containing from 0.1% to 50% (preferably 1% to 35%) by weight of a lithium ion-conducting additive dispersed in a conducting polymer network material.

Further, we have unexpectedly discovered that the presence of an amount of a lithium salt or sodium salt (1-35% by weight) and a liquid solvent (0-50%) can significantly increase the lithium-ion or sodium ion conductivity of the conducting polymer network.

The first step for producing encapsulated active material particles is to dissolve a conducting polymer or its precursor (e.g. uncured oligomer or polymer) in a solvent to form a polymer solution. Subsequently, particles of a cathode active material (e.g. primary particles of sulfur-carbon hybrid, sulfur-graphite hybrid, sulfur-graphene hybrid, sulfur compound, metal sulfide, etc.) are dispersed in this polymer solution to form a suspension (dispersion or slurry). This suspension can then be subjected to a micro-droplet forming and solvent removal treatment while individual particles remain substantially separated from one another. The uncured polymer/oligomer precipitates out to deposit on surfaces of these active material particles. This can be accomplished, for instance, via spray drying, ultrasonic spraying, air-assisted spraying, aerosolization, and other secondary particle formation procedures. The precursor is then cured or polymerized.

In some embodiments, the conducting polymer network may form a mixture with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, polydimethylsiloxane, poly(vinylidene fluoride)-hexafluoropropylene (PVDF-HFP), a derivative thereof (e.g. sulfonated versions), or a combination thereof.

Each of these conducting polymer networks can be used to encapsulate particles of an active material by one of several means: melt mixing (followed by pelletizing and ball-milling, for instance), solution mixing (dispersing the active material particles in an uncured polymer, monomer, or oligomer, with or without an organic solvent) followed by drying (e.g. spray drying), interfacial polymerization, or in situ polymerization in the presence of the active material particles.

C. Encapsulation of Cathode Active Material Particles by a Conducting Polymer Network Several micro-encapsulation processes require the conducting polymer or its precursor (monomer or oligomer) to be dissolvable in a solvent. Fortunately, the uncured conducting polymer or their precursors (monomers or oligomer) are soluble in water or other common solvents. Some monomers are in a liquid state at room temperature. The polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized, cured or hardened, or the solvent is removed.

There are three broad categories of micro-encapsulation methods that can be implemented to produce conducting polymer network composite-encapsulated particles of a cathode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution, optionally comprising a conductive reinforcement material dispersed therein, etc.) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (uncured polymer or its monomer or oligomer dissolved in a solvent, or its monomer or oligomer alone in a liquid state, optionally plus a conductive reinforcement materials, such as CNT, CNF, and graphene) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/ hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Active material particles may be encapsulated using a rotating extrusion head containing concentric nozzles. In this process, a stream of core fluid (e.g. slurry containing particles of an active material and a conductive reinforcement material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin elastomer composite shell to fully embrace the solid particles of the active material.

Coacervation-phase separation: This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Figure 1A:
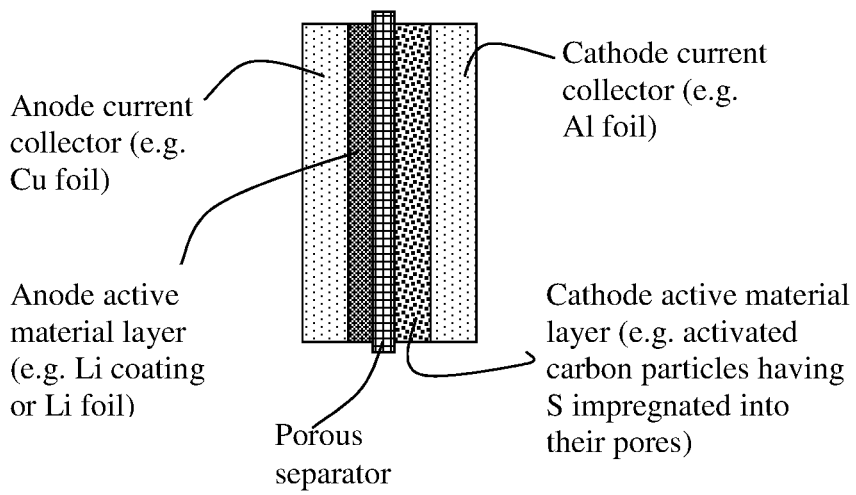
FIG. 1(A) Schematic of a prior art alkali metal-sulfur battery cell.
Figure 1B:
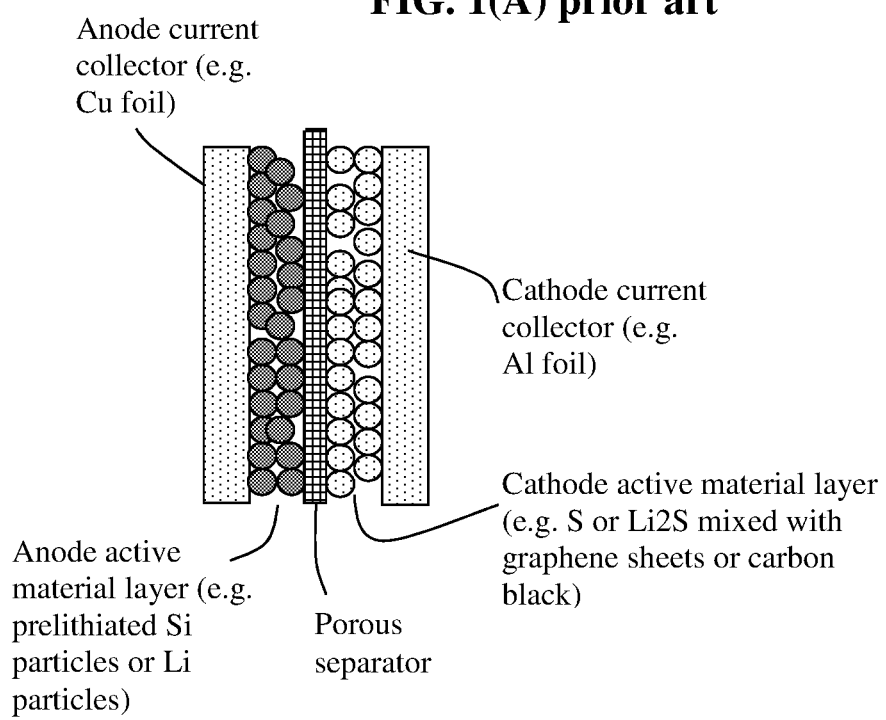
FIG. 1(B) Schematic of another prior art alkali metal-sulfur battery cell.
Figure 2:
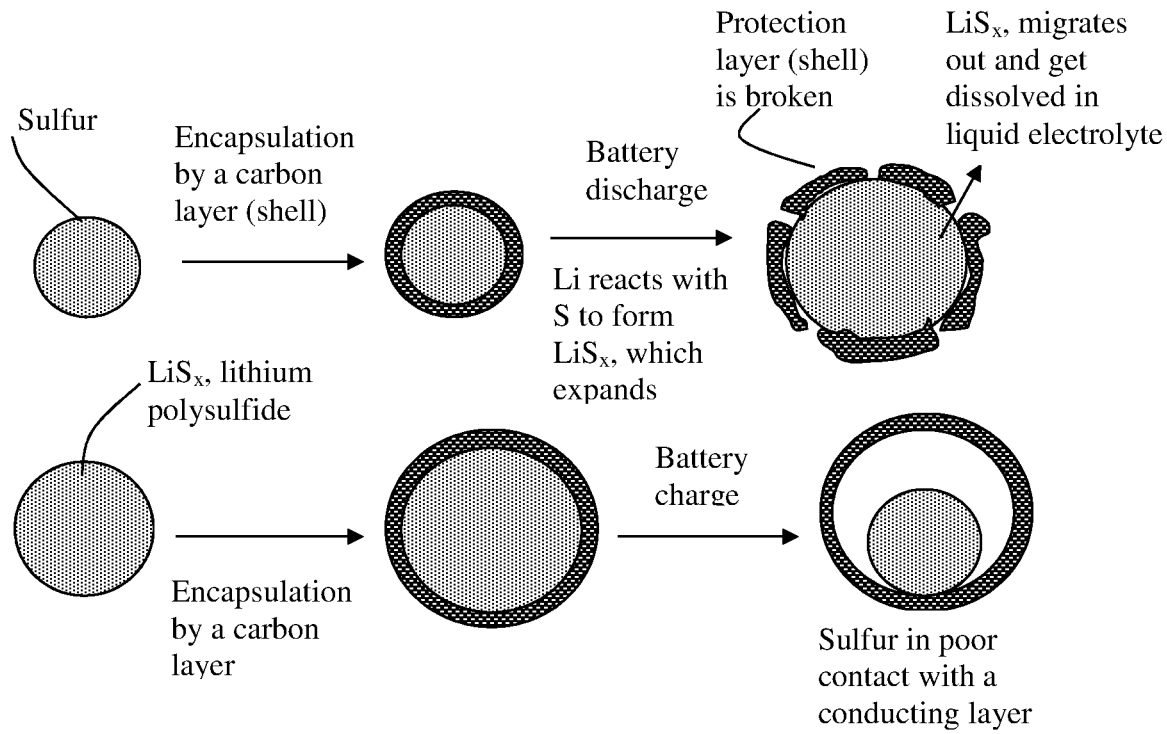
FIG. 2 The issues associated with the cathode active material of a prior art alkali metal battery; for instance, a metal sulfide particle encapsulated by a protective shell (e.g. carbon shell) in a core-shell structure inevitably leads to breakage of the shell and that a metal sulfide particle encapsulated with a protective layer leads to poor contact between the contracted metal sulfide particle and the rigid protective shell during battery charge.

D. Additional Details about the Encapsulated Particulates, the Cathode Layer, and the Structure of Li—S, Na—S, and K—S Cells The anode active material layer of an alkali metal-sulfur cell can contain a foil or coating of Li, Na, or K supported by a current collector (e.g. Cu foil), as illustrated in the left-hand portion of FIG. 1(A) for a prior art Li—S cell. Alternatively, the anode active material may contain, for instance, particles of pre-lithiated Si particles or surface-stabilized Li particles, as illustrated in the left-hand portion of FIG. 1(B). However, the cathode layer in the instant cell is distinct, as already discussed above.

The electrolyte for an alkali metal-sulfur cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among these, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In the presently invented products (including the alkali metal cell, the cathode active layer, and the cathode active material powder), the core material (to be encapsulated by a thin layer of conducting polymer network) contains the sulfur-carbon hybrid, sulfur-graphite hybrid, sulfur-graphene hybrid, conducting polymer-sulfur hybrid, metal sulfide, sulfur compound, etc. These hybrid or compound materials are produced in the form of particles that contain a mixture, blend, composite, or bonded entity of sulfur or sulfide with a carbon, graphite, graphene, or conducting polymer material. Metal sulfides (e.g. lithium polysulfide, sodium polysulfide, etc.) and sulfur compounds are readily available in a fine particle form. Sulfur can be combined with a conducting material (carbon, graphite, graphene, and/or conducting polymer) to form a composite, mixture, or bonded entity (e.g. sulfur bonded on graphene oxide surface).

There are many well-known procedures that can be used to make the aforementioned sulfur-containing materials into particles. For instance, one may mix solid sulfur with a carbon or graphite material to form composite particles using ball-milling. The resulting particles are typically ellipsoidal or potato-like in shape having a size from 1 to 20 μm. Also, one may infiltrate S or sulfide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit sulfur onto surfaces of graphene sheets, CNTs, carbon nano-fibers, etc. and then form these S-coated nano-materials into a spherical or ellipsoidal shape using high-intensity ball-milling, spray-drying (of their suspensions), aerosol formation, etc. These particles are then encapsulated with a conducting polymer network composite using the micro-encapsulation processes discussed above.

The cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem.

Thus, it is highly advantageous to obtain a high sulfur loading and yet, concurrently, maintaining an ultra-thin/small thickness/diameter of sulfur for significantly enhanced sulfur utilization efficiency, energy density and power density. For instance, one can deposit nano-scaled sulfur (1-5 nm thick) on graphene surfaces using chemical, electro-chemical, or vapor deposition to form S-coated or S-bonded graphene sheets. These S-coated or S-bonded graphene sheets are then aggregated together using a tumbling mixing, ball-milling, or spraying procedure. These steps enable the preparation of S-conducting material hybrids that contain 85%-99% by weight sulfur, yet maintaining a coating thickness or particle diameter from 1 nm to 5 nm. This ultra-small dimension enables fast lithium diffusion and lithium-sulfur reactions, leading to high S utilization efficiency (hence, high energy density) even at high charge-discharge rates. By implementing a conducting polymer network composite around these hybrid particles or sulfur compound/sulfide particles, we have significantly reduced and even eliminated the shuttling effect, resulting in an alkali metal battery that has long cycle-life.

Again, the shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that the embracing conducting polymer network has effectively trapped sulfur and metal polysulfide therein, thereby preventing or reducing such a dissolution and migration issue. We have solved the most critical, long-standing problem of alkali metal-sulfur batteries.

This cathode active material layer may further comprise a binder resin that bonds the multiple particulates (of encapsulated sulfur-containing particles) together to form the cathode active material layer. In the aforementioned cathode active material layer, the binder resin is not part of the multiple particulates (i.e. not included inside the core portion of a particulate) and is external to the multiple particulates. The conducting polymer network composite does not embrace the binder resin and the binder resin is not embedded in the conducting polymer network composite. The binder resin does not embrace the particulate as well.

In all versions of the above-discussed alkali metal-sulfur cells, the anode active material may contain, as an example, lithium metal foil (or powder) or a high-capacity Si, Sn, Al, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, Al, $SnO_2$, etc.).

At the anode side, when lithium metal is used as the sole anode active material in a Li—S cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nano-structure composed of conductive nano-filaments. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nanofiber (CNF), graphite nanofiber (GNF), carbon nano-tube (CNT), metal nanowire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nanofibers may be selected from the group consisting of an electrically conductive electro-spun polymer fiber, electro-spun polymer nanocomposite fiber comprising a conductive filler, nanocarbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-sulfur with a conventional anode configuration: The cell contains an optional cathode current collector, a presently invented cathode layer, a separator/electrolyte, and an anode current collector. Potential dendrite formation may be overcome by using a high-concentration electrolyte or solid-state electrolyte at the anode.

(B) Lithium metal-sulfur cell with a nano-structured anode configuration: The cell contains an optional cathode current collector, a cathode herein invented, a separator/electrolyte, an optional anode current collector, and a nano-structure to accommodate lithium metal that is deposited back to the anode during a charge or re-charge operation. This nano-structure (web, mat, or paper) of nano-filaments provide a uniform electric field enabling uniform Li metal deposition, reducing the propensity to form dendrites. This configuration can provide a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant disclosure, a separator/electrolyte, and an anode current collector; and (D) Lithium ion-sulfur cell with a nano-structured anode: For instance, the cell contains a web of nano-fibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant disclosure, and an optional cathode collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

Example 1: Mixing of Sulfur with Carbon/Graphite Particles Via Ball-Milling to Form Sulfur-Containing Particles Sulfur and lithium polysulfide particles and particles of soft carbon (i.e. graphitizable disordered carbon), natural graphite, meso-phase carbon, expanded graphite flakes, carbon nano-fibers, and graphene sheets (50% to 85% by weight of S in the resulting composite or hybrid) were physically blended and then subjected to ball milling for 2-24 hours to obtain S-containing composite particles (typically in a ball or potato shape). The particles, having a typical size of 1-10 µm, containing various S contents, were then embraced with a thin layer of conducting polymer network composite (to be further described later). Some of the resulting particulates, along with a conductive additive (5% by wt.) and a resin binder (PVDF, 5%), were then combined and made into a layer of cathode using the well-known slurry coating procedure.

Example 2: Simple Sulfur Melt or Liquid Solution Mixing

One way to combine sulfur with a conducting material (e.g. carbon/graphite particles) is to use a solution or melt mixing process. Highly porous activated carbon particles, chemically etched meso-carbon micro-balls (activated MCMBs), and exfoliated graphite worms were mixed with sulfur melt at 117-120° C. (slightly above the melting point of S, 115.2° C.) for 10-60 minutes to obtain sulfur-impregnated carbon particles.

Example 3: Preparation of Sulfur-Coated Graphene Sheets and their Secondary Particles (Particulates)

The step involves producing vapor of elemental sulfur, allowing deposition of S vapor on surfaces of single-layer or few-layer graphene sheets. The graphene sheets, suspended in a liquid medium (e.g. graphene oxide in water or graphene in NMP), were sprayed onto a substrate (e.g. glass surface) to form a thin layer of graphene sheets. This thin layer of graphene was then exposed to sublimation-generated physical vapor deposition. Sublimation of solid sulfur occurs at a temperature greater than 40° C., but a significant and practically useful sublimation rate typically does not occur until the temperature is above 100° C. We typically used 117-160° C. with a vapor deposition time of 10-120 minutes to deposit a thin film of sulfur on graphene surface (sulfur thickness being approximately from 1 nm to 10 nm). This thin layer of graphene having a thin film of sulfur deposited thereon was then easily broken into pieces of S-coated graphene sheets using an air jet mill. Some of these S-coated graphene sheets were directly embraced with a conducting polymer network composite. Some of these sheets were made into secondary particles of approximately 5-15 µm in diameter (e.g. via spray-drying) and then encapsulated by the conducting polymer network composite.

Example 4: Electrochemical Impregnation of S in Various Porous Carbon/Graphite Particles The electrochemical impregnation of S into pores of activated carbon fibers, activated carbon nano-tubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating sulfur into pores was conducted at a current density in the range from 1 mA/g to 10 A/g, based on the layer weight of the porous carbon/graphite particles/fibers.

The chemical reactions that occur in this reactor may be represented by the following equation: $M_xS_y \rightarrow M_xS_{y-z} + zS$ (typically z=1-4). The sulfur coating thickness or particle diameter and the amount of S coating/particles impregnated may be controlled by the electro-chemical reaction current density, temperature and time. In general, a lower current density and lower reaction temperature lead to a more uniform impregnation of S and the reactions are easier to control. A longer reaction time leads to a larger amount of S saturated in the pores. Additionally, the electrochemical method is capable of rapidly converting the impregnated S into metal polysulfide (lithium polysulfide, sodium polysulfide, and potassium polysulfide, etc.).

Example 5: Chemical Reaction-Induced Impregnation of Sulfur

A chemical impregnation method was herein utilized to prepare S-impregnated carbon fibers that have been chemically activated. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+ \rightarrow (x-1) S+H_2S$.

Example 6: Redox Chemical Reaction-Induced Impregnation of Sulfur in Activated MCMBs and Activated Needle Coke In this chemical reaction-based deposition process, sodium thiosulfate ($Na_2S_2O_3$) was used as a sulfur source and HCl as a reactant. An activated MCMB-water or activated needle coke-water suspension was prepared and then the two reactants (HCl and $Na_2S_2O_3$) were poured into this suspension. The reaction was allowed to proceed at 25-75° C. for 1-3 hours, leading to impregnation of S into pores of the activated structures. The reaction may be represented by the following reaction: $2HCl+Na_2S_2O_3 \rightarrow 2NaCl+S\downarrow+SO_2\uparrow+H_2O$.

Example 7: Production of PEDOT:PSS Networks-Embedded Cathode Particulates

Several types of sulfur-based cathode active materials prepared in Examples 1-4 were investigated. These are used as examples to illustrate the best mode of practice.

Poly(3,4-ethylenedioxythiophene):polystyrene sulfonate (PEDOT:PSS) is a polymer mixture of two ionomers. One component is made up of sodium polystyrene sulfonate (PSS), which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is initially soluble in water. If a curing agent is used, the polymer may be further cured to increase the degree of cross-linking.

Primary particles of a S-based cathode active material were dispersed in a PEDOT/PSS-water solution to form a slurry (2-8% by wt. solid content), which was spray-dried to form micro-droplets of PEDOT/PSS-embedded cathode active material particles.

Example 8: Cathode Particulates Containing Primary Particles of $CuF_2$ and NCA, Embedded in Conductive Network of Crosslinked Polypyrrole (PPy) Chains The process of Example 7 was replicated with PEDOT/PSS being replaced by polypyrrole (PPy) network. The polypyrrole hydrogel was prepared by following the following procedure: Solution A was prepared by mixing 1 mL $H_2O$ and 0.5 mL phytic acid together and then injecting 142 μL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution.

For instance, primary particles of S-impregnated activated carbon particles or S-coated graphene sheets were separately dispersed in a reacting precursor solution to form a suspension, which was rapidly spray-dried to form micro-droplets. These micro-droplets contain anode active material primary particles embedded in polypyrrole hydrogel. The micro-droplets were totally dried by removing all of the water content from the gel under vacuum at 60° C. for 24 hours.

Example 9: Production of Networks of Crosslinked Polyaniline Chains-Protected Cathode Particles In some embodiments, the precursor may contain a monomer, an initiator, oxidizer or catalyst, a crosslinking agent, and an optional dopant. As an example, 3.6 ml solution A, which contains 400 mM aniline monomer and 120 mM phytic acid (as a crosslinking agent and a dopant), was added and mixed with 280 mg particles prepared in Examples 3-5 (as a cathode active material) and optionally 40 mg carbon nanotubes or graphene oxide (GO) sheets (as a reinforcement material) in water. Subsequently, 1.2 ml solution B, containing 500 mM ammonium persulfate (oxidative initiator), was added into the above mixture and subjected to bath sonication for 1 min. The mixture suspension was spray-dried to form micro-droplets. In about 2-3 min, the solution changed color from brown to dark green and became viscous and gel-like, indicating in-situ polymerization of aniline monomer to form the PANi hydrogel.

The micro-droplets, with or without the presence of CNTs/GO sheets, were then vacuum-dried at 50° C. for 24 hours to obtain network of crosslinked PANi chains-protected cathode particles. The resulting multi-functional particulates (networks of PANi chains-embedded cathode particles), along with a SBR binder, and Super-P conductive additive were then made into a cathode electrode.

Examples 10: Heparin-Based Material as a Curing Agent for the Preparation of a Conducting Network of Polyaniline Chains The conducting networks of crosslinked PANi may be produced from a monomer using heparin-based crosslinking agent (e.g. instead of or in addition to phytic acid). Aqueous solutions of heparin (0.21% w/w) were prepared using 5M NaOH. Photo-crosslinkable heparin methacrylate (Hep-MA) precursors were prepared by combining heparin (porcine source, Mw~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm relative to the peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. The cathode active particles prepared in Examples 4-6 were separately added into the solution as a cathode active material. The slurry was then made into micro-droplets using air suspension coating. Gels were photo-crosslinked using UV illumination for 30-60 min ($\lambda$max=365 nm, 10 mW/cm$^2$). Hep-MA/PANI dual-networks were formed by sequentially incubating crosslinked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di H$_2$O after oxidative polymerization. The micro-droplets were then vacuum-dried at 50° C. for 24 hours to obtain network of crosslinked PANi chains-protected cathode particles.

Various types of graphene sheets were used to reinforce the networks of crosslinked conductive chains, including pristine graphene, GO, RGO, graphene fluoride, and nitrogenated graphene. The preparation of these example graphene sheets is briefly discussed in Examples 11-15 below:

Example 11: Graphene Oxide from Sulfuric Acid Intercalation and Exfoliation of MCMBs MCMB (meso-carbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

Example 12: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

Example 13: Preparation of Pristine Graphene Sheets

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements.

Example 14: Preparation of Graphene Fluoride (GF) Sheets

Several processes have been used by us to produce GF, but only one process is herein described as an example. In a typical procedure, highly exfoliated graphite (HEG) was prepared from intercalated compound $C_2F.xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled ClF$_3$, and then the reactor was closed and cooled to liquid nitrogen temperature. Subsequently, no more than 1 g of HEG was put in a container with holes for ClF$_3$ gas to access the reactor. After 7-10 days, a gray-beige product with approximate formula $C_2F$ was formed. GF sheets were then dispersed in halogenated solvents to form suspensions.

Example 15: Preparation of Nitrogenated Graphene Sheets

Graphene oxide (GO), synthesized in Example 12, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

Example 16: Cathode Active Material Layers Containing Conducting Polymer Network-Encapsulated Sulfur-Carbon/Graphite/Graphene Particles Selected amounts of sulfur-carbon, sulfur-graphite, and sulfur-graphene hybrid/composite particles were then each made into conducting polymer network-encapsulated particulates. In the above procedure, two routes were followed to prepare conducting polymer network-encapsulated hybrid particles. In the first route, hybrid particles were dispersed in the polymer solution to form a slurry. In some samples, 0.5%-5% of a conductive filler (e.g. graphene sheets or CNTs) was added into the slurry. The slurries were separately spray-dried to form particulates of polymer-encapsulated hybrid particles.

In the second route, 1-45% of lithium salt was dissolved in the solution to form a series of lithium salt-containing solutions. Then, hybrid particles were dispersed in the lithium-containing polymer solution to form a series of slurries. In some samples, 0.5%-5% of a conductive filler (e.g. graphene sheets) was added into the slurry. Each slurry (with or without graphene sheets) was spray-dried to form particulates of conducting polymer network- or conducting polymer network/lithium salt-encapsulated hybrid particles.

Several series of Li metal-sulfur and Li-ion sulfur cells were prepared using the presently prepared cathode layers. The first series is a Li metal cell containing a copper foil as an anode current collector and the second series is also a Li metal cell having a nano-structured anode of conductive filaments (based on electro-spun carbon fibers or CNFs). The third series is a Li-ion cell having a nano-structured anode of conductive filaments (based on electro-spun carbon fibers coated with a thin layer of Si using CVD) plus a copper foil current collector. The fourth series is a Li-ion cell having a pre-lithiated graphite-based anode active material as an example of the more conventional anode. We have found that after large numbers of charge/discharge cycles, the cells containing a nano-structured anode were essentially dendrite-free.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 5:
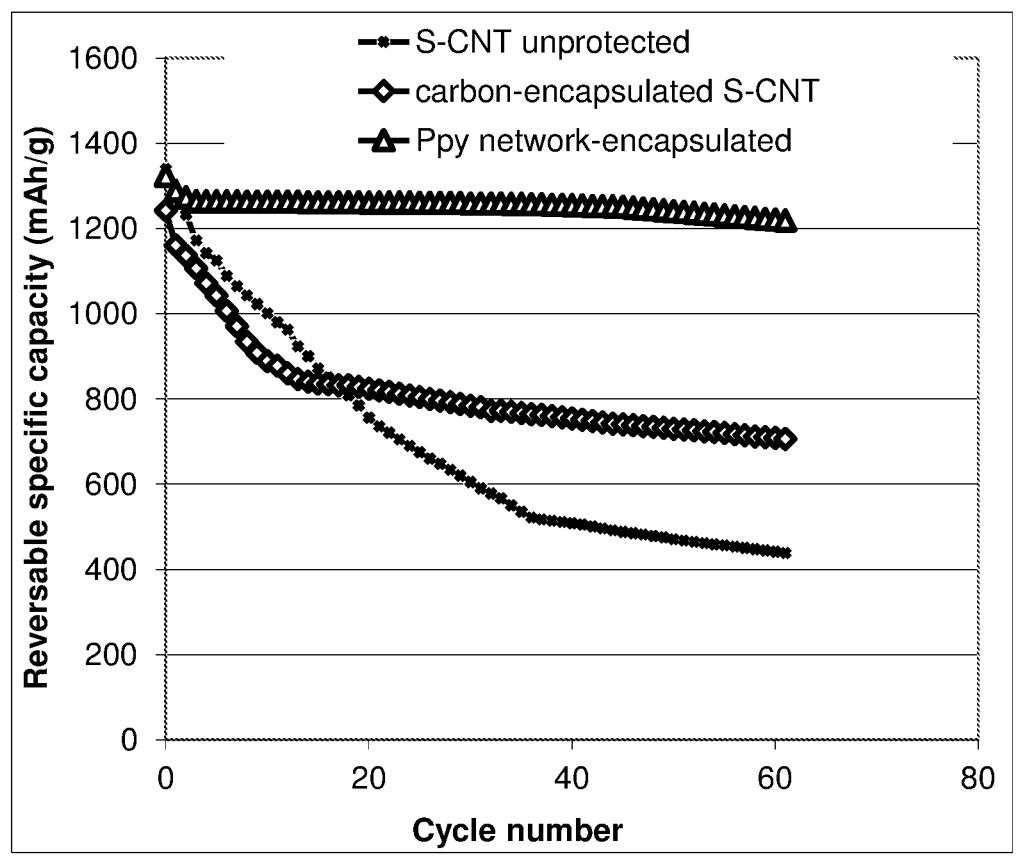
FIG. 5 The cathode specific capacity values of three Li—S battery having a cathode active material based on a S/CNT hybrid featuring (1) PPy network-encapsulated S/CNT hybrid particles, (2) carbon-encapsulated C/CNT hybrid particles, and (3) un-protected S/CNT hybrid particles, respectively.

The cycling behaviors of 3 cells are shown in FIG. 5, which indicates that PPy network/graphene encapsulation of S/CNT particles provides the most stable cycling response. Carbon coating alone does not help to improve cycling stability by much.

Figure 6:
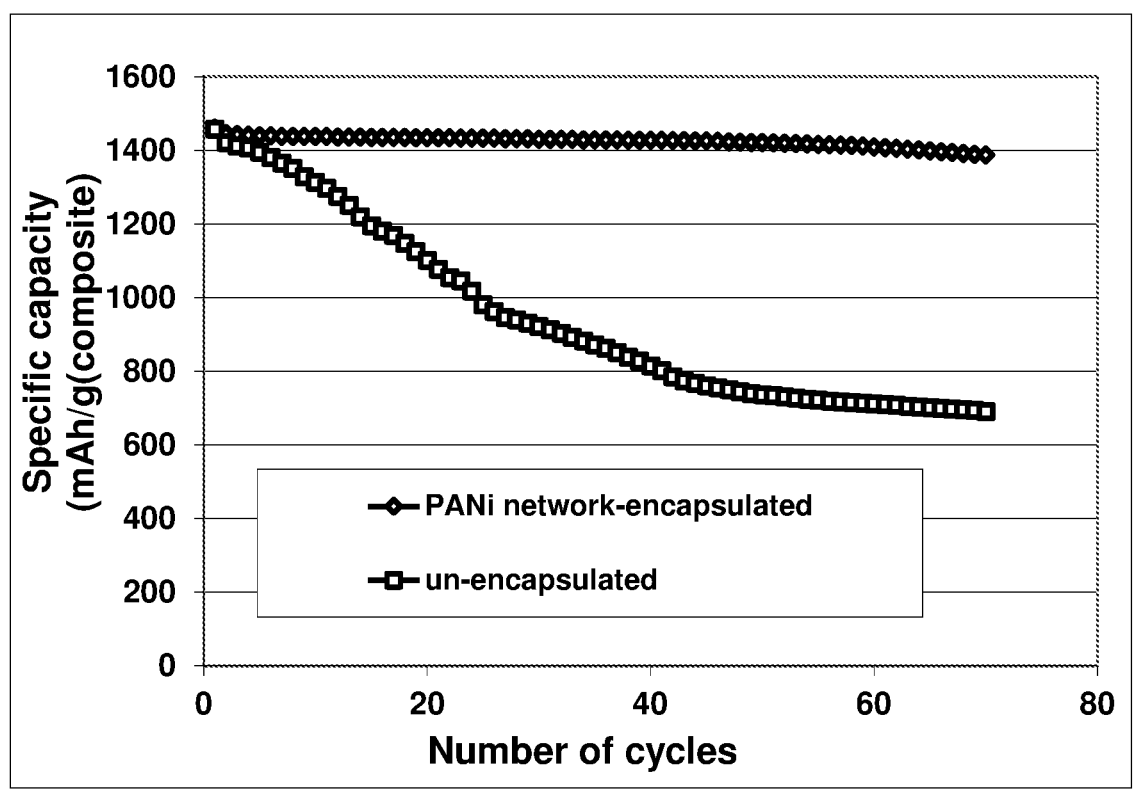
FIG. 6 The cathode specific capacity values of two Li—S batteries having a cathode active material layer featuring (1) PANi network-encapsulated S/graphene hybrid particles and (2) un-protected S/graphene hybrid particles, respectively.

Example 17: Graphene/Sulfur Particles Encapsulated by a Conducting Polymer Network Shown in FIG. 6 are the cycling behaviors of 2 Li—S cells; one cell has a cathode containing particulates of PANi network-encapsulated sulfur-graphene composite balls and the other cell has a cathode containing particulates of un-protected sulfur-graphene composite balls. The conducting polymer network composite has imparted cycle stability to the Li—S cell in a most dramatic manner.

Figure 7:
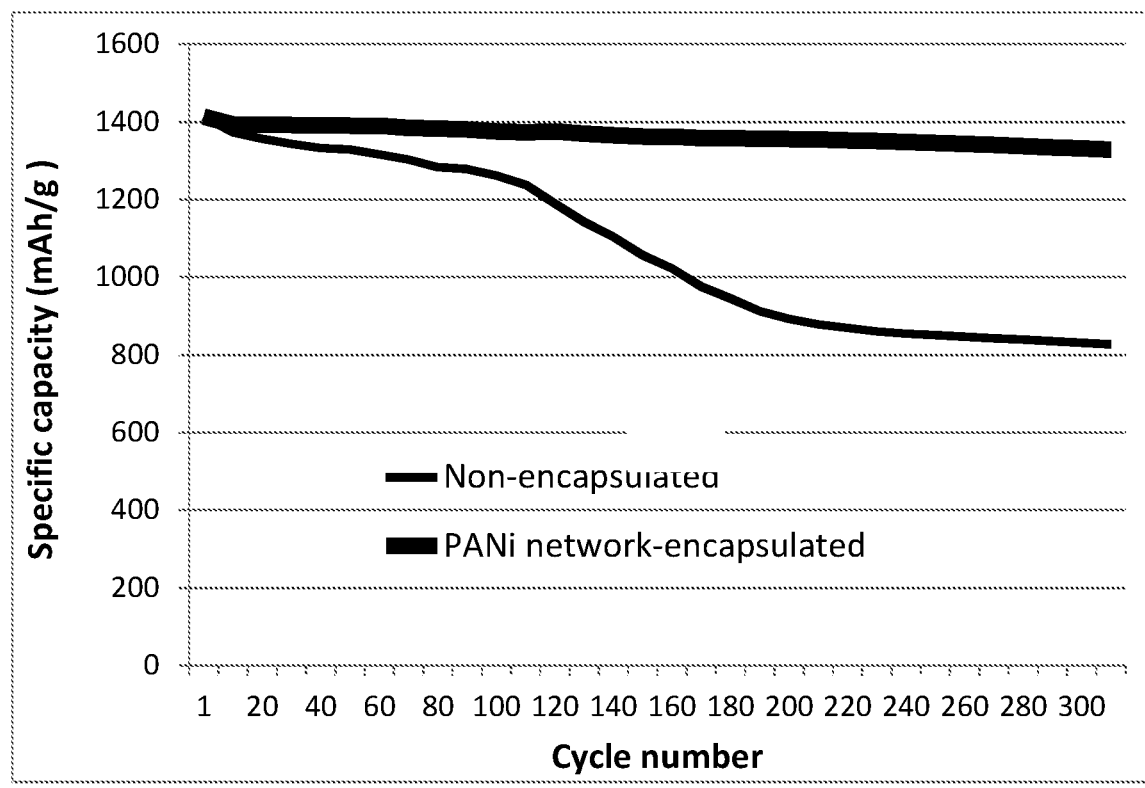
FIG. 7 The cathode specific capacity values of two Na—S cells having a cathode active material layer featuring (1) conducting polymer network-encapsulated sulfur-MCMB (activated) composite particles; and (2) un-protected sulfur-MCMB (activated) composite particles, respectively.

Example 18: Sulfur-Impregnated Activated MCMB Particles Encapsulated by a PANi- FIG. 7 shows the cycling behavior of two room-temperature Na—S cell: one cell has a cathode containing particulates of PANi network composite-encapsulated sulfur-MCMB (activated) composite particles and the other cell has a cathode containing particulates of un-protected sulfur-MCMB (activated) composite particles. Again, the conducting polymer network composite has significantly improved the cycle stability to the Na—S cell.

The above cycling stability data have clearly demonstrated that the shuttling effect commonly associated with Li—S or Na—S cells has been significantly reduced or essentially eliminated by the presently invented conducting polymer network composite encapsulation approach.

Example 19: Effect of Lithium Ion-Conducting Additive in a Conducting Polymer Network Composite A wide variety of lithium ion-conducting additives were added to several different conducting polymer networks to prepare encapsulation shell materials for protecting core particles of S cathode active materials. We have discovered that these composite materials are suitable encapsulation shell materials provided that their lithium ion conductivity at room temperature is no less than $10^{-6}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 1

Lithium ion conductivity of various conducting polymer network composite compositions as a shell material for protecting active material particles.

| Sample No. | Lithium-conducting additive | Conducting polymer network (0.3-2 μm thick) | Li-ion conductivity (S/cm) |
|---|---|---|---|
| E-1s | $Li_2CO_3$ + $(CH_2OCO_2Li)_2$ | 70-99% PANi, 2% RGO | $4.3 \times 10^{-6}$ to $5.6 \times 10^{-3}$ S/cm |
| E-2s | $Li_2CO_3$ + $(CH_2OCO_2Li)_2$ | 65-99% PANi, 8% pristine graphene | $3.6 \times 10^{-5}$ to $9.5 \times 10^{-4}$ S/cm |
| E-3s | $Li_2CO_3$ + $(CH_2OCO_2Li)_2$ | 65-80% PANi, 15% RGO | $9.8 \times 10^{-6}$ to $1.3 \times 10^{-3}$ S/cm |
| D-4s | $Li_2CO_3$ + $(CH_2OCO_2Li)_2$ | 70-99% PANi, 12% nitrogenated graphene | $2.8 \times 10^{-6}$ to $8.8 \times 10^{-4}$ S/cm |

TABLE 1-continued

Lithium ion conductivity of various conducting polymer network composite compositions as a shell material for protecting active material particles.

| Sample No. | Lithium-conducting additive | Conducting polymer network (0.3-2 μm thick) | Li-ion conductivity (S/cm) |
|---|---|---|---|
| D-5s | $Li_2CO_3 + (CH_2OCO_2Li)_2$ | 75-99% PPy | $3.4 \times 10^{-5}$ to $9.8 \times 10^{-3}$ S/cm |
| B1s | $LiF + LiOH + Li_2C_2O_4$ | 80-99% PPy | $3.4 \times 10^{-6}$ to $8.5 \times 10^{-4}$ S/cm |
| B2s | LiF + HCOLi | 80-99% PPy | $6.9 \times 10^{-6}$ to $6.8 \times 10^{-3}$ S/cm |
| B3s | LiOH | 70-99% PPy | $5.6 \times 10^{-5}$ to $5.5 \times 10^{-3}$ S/cm |
| B4s | $Li_2CO_3$ | 70-99% PPy | $5.4 \times 10^{-5}$ to $7.7 \times 10^{-3}$ S/cm |
| B5s | $Li_2C_2O_4$ | 70-99% PPy | $3.7 \times 10^{-5}$ to $3.4 \times 10^{-3}$ S/cm |
| B6s | $Li_2CO_3 + LiOH$ | 70-99% PEDDOT/PSS | $2.7 \times 10^{-5}$ to $4.9 \times 10^{-3}$ S/cm |
| C1s | $LiClO_4$ | 70-99% PEDDOT/PSS | $6.8 \times 10^{-5}$ to $6.4 \times 10^{-3}$ S/cm |
| C2s | $LiPF_6$ | 70-99% PEDDOT/PSS | $5.9 \times 10^{-5}$ to $2.9 \times 10^{-3}$ S/cm |
| C3s | $LiBF_4$ | 70-99% PEDDOT/PSS | $4.6 \times 10^{-5}$ to $7.8 \times 10^{-4}$ S/cm |
| C4s | $LiBOB + LiNO_3$ | 70-99% PEDDOT/PSS | $1.5 \times 10^{-5}$ to $9.2 \times 10^{-4}$ S/cm |
| S1s | Sulfonated polyaniline | 85-99% PANi | $8.3 \times 10^{-6}$ to $1.2 \times 10^{-3}$ S/cm |
| S2s | Sulfonated SBR | 85-99% PANi | $8.3 \times 10^{-6}$ to $6.8 \times 10^{-4}$ S/cm |
| S3s | Sulfonated PVDF | 80-99% PANi | $5.8 \times 10^{-6}$ to $6.4 \times 10^{-4}$ S/cm |
| S4s | Polyethylene oxide | 80-99% PANi | $6.9 \times 10^{-6}$ to $5.9 \times 10^{-4}$ S/cm |

Example 20: Cycle Stability of Various Rechargeable Lithium Battery Cells

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented conducting polymer network composite-encapsulated sulfur cathode particles vs. other types of cathode active materials.

TABLE 2

Cycle life data of various lithium-sulfur batteries.

| Sample ID | Type of conducting polymer network + 2% graphene or CNT | Type & % of active material | Initial capacity (mAh/g) | Cycle life (No. of cycles) |
|---|---|---|---|---|
| CNF-1 | Sulfonated PB encapsulation | 80% by wt. S + 7% CNF + 3% rotaxane + 5% binder + 5% CB | 1,265 | 1,550 |
| CNF-2 | Carbon encapsulation | 80% by wt. S + 7% CNF + 3% carbon + 5% binder + 5% CB | 1,280 | 165 |
| AC-1 | No encapsulation | 70% S + 15% AC + 8% binder + 7% CB | 1,258 | 155 |
| AC-2 | SBS (75%) + PEO (25%) | 70% S + 15% AC + 3% polymer mixture + 5% binder + 7% CB | 1,259 | 1,335 |
| Gn-3 | PU encapsulation | 90% S (coated on graphene sheets) | 1454 | 2,477 |
| Gn-4 | Carbon encapsulation | 90% S (coated on graphene sheets) | 1453 | 188 |
| CB-1 | No encapsulation | 70% S + 22% CB + 8% binder | 1020 | 47 |
| CB-2 | SIBS encapsulation | 70% S + 20% CB + 4% PEO + 6% binder | 1035 | 1315 |

The following observations can be made from Table 2, FIG. 5-FIG. 7 and other testing data:

1) The presently invented conductive conducting polymer network encapsulation approach enables the Li—S, Na—S, and K—S batteries to deliver high cycling stability or long cycle life.
2) The invented approach also leads to alkali metal-sulfur batteries having exceptional energy densities and power densities. A cell-level energy density as high as 630 Wh/kg has been achieved with Li—S cells featuring a cathode active material encapsulated by a conducting polymer network composite.
3) Similar advantageous features are also observed with Na—S cells and K—S cells.

In summary, the present disclosure provides an innovative, versatile, and surprisingly effective platform materials technology that enables the design and manufacture of superior alkali metal-sulfur rechargeable batteries. The alkali metal-sulfur cell featuring a cathode layer containing particulates of sulfur/conducting material hybrid particles encapsulated by a conducting polymer network exhibits a high cathode active material utilization rate, high specific capacity, high specific energy, high power density, little or no shuttling effect, and long cycle life. When a nano-structured carbon filament web is implemented at the anode to support a lithium film (e.g. foil), the lithium dendrite issue is also suppressed or eliminated.

The invention claimed is:

1. A rechargeable alkali metal-sulfur cell selected from lithium-sulfur cell, sodium-sulfur cell, or potassium-sulfur cell, said alkali metal-sulfur cell comprising:
   (a) an anode active material layer and an optional anode current collector supporting said anode active material layer;
   (b) a cathode active material layer and an optional cathode current collector supporting said cathode active material layer; and (c) an electrolyte with an optional porous separator layer in ionic contact with said anode active material layer and said cathode active material layer;

wherein said cathode active material layer contains multiple particulates of a sulfur-containing material selected from a sulfur-carbon hybrid, sulfur-graphite hybrid, sulfur-graphene hybrid, conducting polymer-sulfur hybrid, metal sulfide, sulfur compound, or a combination thereof and wherein at least one of said particulates has a diameter or thickness from 100 nm to 50 μm and comprises one or a plurality of particles of said sulfur-containing material that are partially or totally encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said conducting network of cross-linked polymer chains comprises a conjugated polymer selected from polyacetylene, polythiophene, poly(3-alkylthiophenes), poly(isothianaphthene), poly(3,4-ethylenedioxythiophene), alkoxy-substituted poly(p-phenylene vinylene), poly(2,5-bis(cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

2. The rechargeable alkali metal-sulfur cell of claim 1, wherein said sulfur-carbon hybrid, sulfur-graphite hybrid, sulfur-graphene hybrid, or conducting polymer-sulfur hybrid is a mixture, blend, composite, chemically or physically bonded entity of sulfur or sulfide with a carbon, graphite, graphene, or conducting polymer material.

3. The rechargeable alkali metal-sulfur cell of claim 1, wherein said conducting network of cross-linked polymer chains further comprises from 0.01% to 50% by weight of a conductive reinforcement material dispersed in said conducting network, wherein said conductive reinforcement material is selected from graphene sheets, carbon nanotubes, carbon nanofibers, metal nanowires, conductive polymer fibers, or a combination thereof.

4. The rechargeable alkali metal-sulfur cell of claim 3, wherein said graphene sheets are selected from pristine graphene, graphene oxide, reduced graphene oxide, graphene fluoride, graphene chloride, nitrogenated graphene, hydrogenated graphene, doped graphene, functionalized graphene, or a combination thereof.

5. A rechargeable alkali metal-sulfur cell selected from lithium-sulfur cell, sodium-sulfur cell, or potassium-sulfur cell, said alkali metal-sulfur cell comprising:
(a) an anode active material layer and an optional anode current collector supporting said anode active material layer;
(b) a cathode active material layer and an optional cathode current collector supporting said cathode active material layer; and
(c) an electrolyte with an optional porous separator layer in ionic contact with said anode active material layer and said cathode active material layer;

wherein said cathode active material layer contains multiple particulates of a sulfur-containing material selected from a metal sulfide and wherein at least one of said particulates has a diameter or thickness from 100 nm to 50 μm and comprises one or a plurality of particles of said sulfur-containing material that are partially or totally encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said metal sulfide contains $M_xS_y$, wherein x is an integer from 1 to 3 and y is an integer from 1 to 10, and M is a metal element selected from Na, K, Mg, Zn, Cu, Ti, Ni, Co, Fe, or Al.

6. A rechargeable alkali metal-sulfur cell selected from lithium-sulfur cell, sodium-sulfur cell, or potassium-sulfur cell, said alkali metal-sulfur cell comprising:
(a) an anode active material layer and an optional anode current collector supporting said anode active material layer;
(b) a cathode active material layer and an optional cathode current collector supporting said cathode active material layer; and
(c) an electrolyte with an optional porous separator layer in ionic contact with said anode active material layer and said cathode active material layer;

wherein said cathode active material layer contains multiple particulates of a sulfur-containing material selected from a metal sulfide and wherein at least one of said particulates has a diameter or thickness from 100 nm to 50 μm and comprises one or a plurality of particles of said sulfur-containing material that are partially or totally encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said metal sulfide contains $Li_2S_3$, $Li_2S_5$, $Li_2S_7$, $Li_2S_9$, $Li_2S_{10}$, $Na_2S_1$, $Na_2S_2$, $Na_2S_3$, $Na_2S_4$, $Na_2S_5$, $Na_2S_6$, $Na_2S_7$, $Na_2S_8$, $Na_2S_9$, $Na_2S_{10}$, $K_2S_1$, $K_2S_2$, $K_2S_3$, $K_2S_4$, $K_2S5$, $K_2S_6$, $K_2S_7$, $K_2S_8$, $K_2S_9$, or $K_2S_{10}$.

7. The rechargeable alkali metal-sulfur cell of claim 1, wherein said carbon or graphite material of said sulfur-carbon hybrid or said sulfur-graphite hybrid in said cathode active material layer is selected from meso-phase pitch, meso-phase carbon, mesocarbon micro-bead (MCMB), coke particle, expanded graphite flake, artificial graphite particle, natural graphite particle, highly oriented pyrolytic graphite, soft carbon particle, hard carbon particle, carbon nanotube, carbon nano-fiber, carbon fiber, graphite nano-fiber, graphite fiber, carbonized polymer fiber, activated carbon, carbon black, or a combination thereof.

8. The rechargeable alkali metal-sulfur cell of claim 1, wherein said conducting polymer-sulfur hybrid contains an intrinsically conductive polymer selected from polyaniline, polypyrrole, polythiophene, polyfuran, a bi-cyclic polymer, a sulfonated derivative thereof, or a combination thereof.

9. The rechargeable alkali metal-sulfur cell of claim 1, wherein said conducting network of cross-linked polymer chains further comprises from 0.1% to 50% by weight of a lithium ion-conducting additive or sodium ion-conducting additive dispersed therein.

10. The rechargeable alkali metal-sulfur cell of claim 9, wherein said lithium ion-conducting additive is selected from $Li_2CO_3$, $Li_2O$, $Li_2C_2O_4$, LiOH, LiX, $ROCO_2Li$, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, 0<x<1, 1<y<4.

11. The rechargeable alkali metal-sulfur cell of claim 9, wherein said lithium ion-conducting additive is dispersed in said conducting network of cross-linked polymer chains and is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF2C2O$_4$), lithium nitrate (LiN$_3$), Li-fluoroalkyl-phosphate (LiPF3(CF$_2$CF$_3$)$_3$), lithium bisperfluoro- ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

12. The rechargeable alkali metal-sulfur cell of claim 9, wherein said lithium ion-conducting additive is selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

13. The rechargeable alkali metal-sulfur cell of claim 1, wherein said conducting network of cross-linked polymer chains has a lithium ion conductivity from $10^{-5}$S/cm to $5\times10^{-2}$ S/cm at room temperature.

14. The rechargeable alkali metal-sulfur cell of claim 1, wherein said electrolyte is selected from polymer electrolyte, polymer gel electrolyte, composite electrolyte, ionic liquid electrolyte, organic liquid electrolyte, solid-state electrolyte, or a combination thereof.

15. The rechargeable alkali metal-sulfur cell of claim 1, wherein said electrolyte contains a salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF2C$_2$O$_4$), lithium nitrate (LiNO$_3$), Li-fluoroalkyl-phosphate (LiPF$_3$(CF$_2$CF$_3$)$_3$), lithium bisperfluoro- ethylsulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-methanesulfonate (NaCF$_3$SO$_3$), potassium trifluoro-methanesulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

16. The rechargeable alkali metal-sulfur cell of claim 1, wherein said electrolyte contains a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone ($\gamma$-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

17. The rechargeable alkali metal-sulfur cell of claim 1, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, Li$_4$Ti$_5$O$_{12}$, or a combination thereof.

18. The rechargeable alkali metal-sulfur cell of claim 1, wherein said cell is a lithium ion-sulfur cell and said anode active material layer contains an anode active material selected from the group consisting of:
(a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof;
(b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;
(c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;
(d) salts and hydroxides of Sn and lithiated versions thereof;
(e) carbon or graphite materials and prelithiated versions thereof; and
combinations thereof.

19. The rechargeable alkali metal-sulfur cell of claim 1, wherein said cell is a sodium ion-sulfur cell or potassium ion-sulfur cell and said anode active material layer contains an anode active material selected from the group consisting of:
(a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Sodium- or potassium-containing alloys or intermetallic compounds of Si, Ge, Sn, Pb, Sb, Bi, Zn, Al, Ti, Co, Ni, Mn, Cd, and their mixtures;
(c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
(d) Sodium or potassium salts;
(e) particles of graphite, hard carbon, soft carbon or carbon particles and pre-sodiated versions thereof; and combinations thereof.

20. The rechargeable alkali metal-sulfur cell of claim 1, wherein said particulates contain from 80% to 99% by weight of sulfur, metal sulfide, or metal compound based on the total weight of said conducting network of cross-linked polymer chains and said sulfur, metal sulfide, or metal compound combined.

* * * * *